(12) United States Patent
Wentland et al.

(10) Patent No.: US 6,604,709 B1
(45) Date of Patent: Aug. 12, 2003

(54) DOT (DEPARTMENT OF TRANSPORTATION) LAVATORY AND SHOWER COMBINATION

(75) Inventors: Mark E. Wentland, Lynnwood, WA (US); Wing Cheung, Shoreline, WA (US); Kevin Shimasaki, Woodinville, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/078,859

(22) Filed: Feb. 20, 2002

(51) Int. Cl.[7] ............................................... B64D 11/02
(52) U.S. Cl. .............................. 244/118.5; 244/117 R
(58) Field of Search ........................ 244/118.1, 118.2, 244/118.5, 118.6, 119, 117, 137.2

(56) References Cited

U.S. PATENT DOCUMENTS

| | | | | |
|---|---|---|---|---|
| 2,650,368 A | * | 9/1953 | Evans ............................ | 52/34 |
| 4,348,777 A | * | 9/1982 | Peterson ........................ | 4/596 |
| 4,477,934 A | * | 10/1984 | Salminen ....................... | 4/596 |
| 4,589,463 A | | 5/1986 | Ryan | |
| 4,645,145 A | * | 2/1987 | Alie ............................ | 105/314 |
| 4,884,767 A | | 12/1989 | Shibata | |
| 5,111,626 A | * | 5/1992 | Fortune ........................ | 52/79.1 |
| 5,150,863 A | | 9/1992 | Hozumi | |
| 5,243,716 A | | 9/1993 | Zaccai et al. | |
| 5,426,900 A | * | 6/1995 | Springer ........................ | 4/460 |
| 5,474,260 A | * | 12/1995 | Schwertfeger et al. ... | 244/118.5 |
| 5,718,008 A | | 2/1998 | Pane | |
| 6,007,025 A | * | 12/1999 | Coughren et al. ........ | 105/329.1 |
| 6,079,669 A | | 6/2000 | Hanay et al. | |
| 6,101,766 A | * | 8/2000 | Mogensen ................ | 105/238.1 |
| 6,182,926 B1 | * | 2/2001 | Moore ....................... | 244/118.5 |
| 6,243,993 B1 | * | 6/2001 | Swensson ...................... | 52/27 |
| 6,256,936 B1 | * | 7/2001 | Swensson et al. ........ | 312/140.1 |
| 6,257,523 B1 | * | 7/2001 | Olliges ........................ | 160/210 |

FOREIGN PATENT DOCUMENTS

| | | | | |
|---|---|---|---|---|
| DE | 29820581 U1 | * | 11/1999 | ............. B60P/3/36 |
| EP | 0872204 | | 4/1997 | |
| EP | 1064875 | | 7/1999 | |
| JP | 11350759 A | * | 12/1999 | ............. E04H/1/12 |

OTHER PUBLICATIONS

"Lavatory Accessiblitliy in single–aisle aircraft", US Dept. of Transportation, 1–12, Appendix A.*

Jim Hightower, "Hightower: Showers on Planes", AlterNet.org, Aug. 22, 2002.*

* cited by examiner

Primary Examiner—Charles T. Jordan
Assistant Examiner—Stephen Holzen
(74) Attorney, Agent, or Firm—Conrad O. Gardner

(57) ABSTRACT

An expandable, modular, multi-mode lavatory for aircraft featuring its multi-mode use as a lavatory, shower and accommodations for handicapped persons. The invention comprises a primary structure with a volume that expands into adjacently located unused space, such as an aircraft's main entry cross-aisleway. Deployable walls and doors are used to create a partitioned environment. A false bottom shower pan cover provides structural support for wheelchairs while also being removable to reveal a modular shower pan for bathing.

10 Claims, 5 Drawing Sheets

DOT (DEPARTMENT OF TRANSPORTATION) LAVATORY AND SHOWER COMBINATION

BACKGROUND OF THE INVENTION

1. Field of the Invention

The present invention relates to an expandable, modular, multi-mode lavatory for aircraft.

2. Description of the Prior Art

Categories of prior art are described in the following:

Lavatories are known in the aircraft art:

U.S. Pat. No. 4,884,767, Lavatory module for a passenger airplane;

U.S. Pat. No. 5,150,863, Lavatory unit for a passenger airplane.

Expandable lavatories are known in the aircraft art:

U.S. Pat. No. 6,079,669, Dual pivot expandable lavatory. A dual pivot expandable lavatory for use in limited spaces such as on an airplane. The lavatory may be positioned proximate the doorway area of the airplane, and is provided with a primary and a secondary pivotable module. Each module is pivotably attached to a stationary assembly conventionally affixed to the ceiling and floor of the airplane.

U.S. Pat. No. 6,007,025, Stowable module airplane lavatory. A stowable module, i.e., a storage container, that provides storage space in the airplane without occupying revenue floorspace. The stowable module comprises an integrated feature of a sidewall lavatory. The stowable module stows inside a sidewall lavatory during ground, takeoff, and landing operations. During flight, the stowable module is deployed by a flight attendant into an adjacent doorway area so that the lavatory can be used by passengers and crew.

U.S. Pat. No. 4,589,463, Expandable volume lavatory. An expandable volume lavatory is enclosed by a three-panel two-position hinged door. When the lavatory is unoccupied, two adjacent panels of the door may be positioned to fit flush with the surrounding wall or enclosure. When occupied, repositioning of the third panel of the door reconfigures the door to increase available lavatory space. The expandable volume lavatory has particular utility in areas where space is at a premium, particularly on board a vehicle such as an aircraft.

Wheelchair enabled shower pans are known in the art.

EP1064875A2, Shower tray arrangement is a perforated shower pan insert for the purposes of facilitating entry and support of a wheelchair in the shower. This is somewhat relevant because the structure in essence forms a double wall shower pan with perforated fluid drains therebetween.

EP872204A3, Shower tray arrangement for disable persons. A shower tray arrangement for disabled persons and comprising a tray having a base, an upstanding side wall and an outlet, and a surface supported above the base of the tray substantially coplanar with an upper edge of the upstanding side wall of the tray at least over part of the length thereof, characterized in that the surface is perforated and is supported above the base of the tray by means of a plurality of protrusions extending downwardly from the underside of the perforated surface to engage the base.

U.S. Pat. No. 5,718,008, Shower base. A piece installed on the floor, constituted by a plate (1,101), whose top side is set at the same level as the floor (9) on which the plate is installed; along at least part of the perimeter of the plate, there is a header (4,102) which is open at the top and which does not rise higher than the top side of the plate; the bottom of the header is situated at a lower level than that of said top side of the plate; the header leads into a drainage orifice (7,104) also situated at a lower level with respect to that of said top side; it is characterized in that the header (4,201) presents a top opening (5,103) for the intake of water from the shower base, said opening being narrower than the header as such. It facilitates the access of elderly and disabled people and of people on wheelchairs.

U.S. Pat. No. 5,243,716, Barrier-free drainage apparatus. A barrier-free drainage apparatus includes a trough positioned adjacent the front edge of a platform. The trough has a bottom wall which is positioned below the front edge of the platform, and at least one outlet opening in fluid flow communication with a drain pipe. A grate is positioned inside the trough and has an upper, generally horizontal position with a plurality of apertures therethrough. The upper portion is supported such that each said portion is substantially the same, a grate having an upper, generally horizontal portion with a plurality of apertures therethrough, said grate also having means for supporting the upper portion such that said upper portion is spaced apart from the trough bottom wall in a generally horizontal position and a top surface of said upper portion is substantially the same height as the front edge of the shower floor.

BRIEF SUMMARY OF THE INVENTION

An expandable multi-mode lavatory for aircraft for use as a lavatory, shower, and accommodation for handicapped persons.

DETAILED DESCRIPTION OF THE INVENTION

Concept 1

Figure 1:
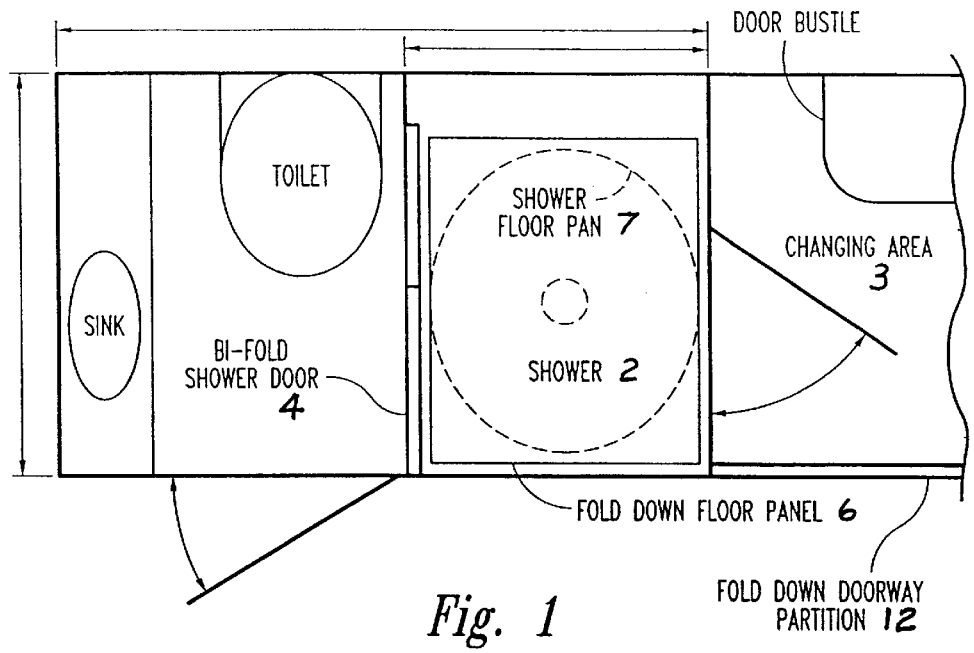
FIG. 1 is a top view of the floor plan of an embodiment (concept 1) of the present DOT lavatory and shower combination with bi-fold shower door and fold-down floor panel to cover wet shower floor pan.
Figure 2:
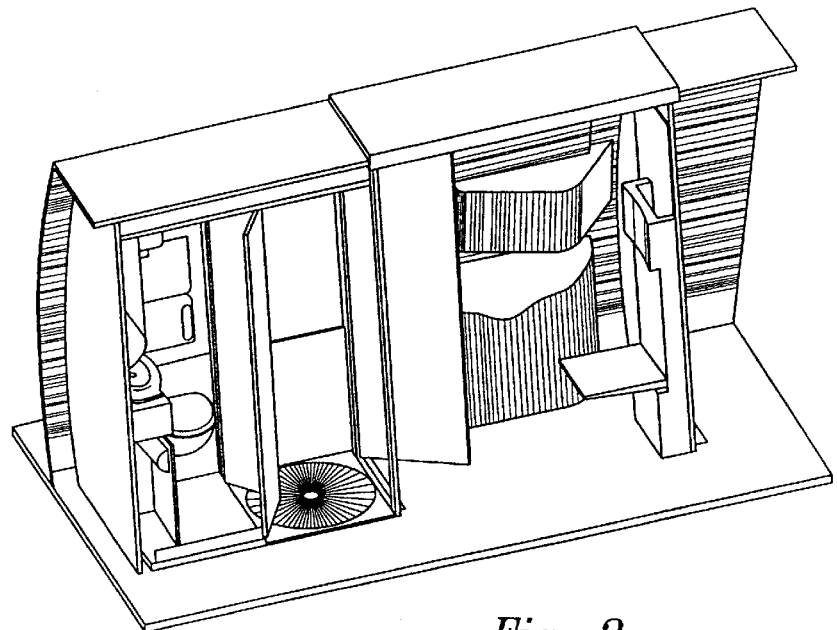
FIG. 2 is a cutaway view showing the interior of the embodiment of FIG. 1.
Figure 9A:
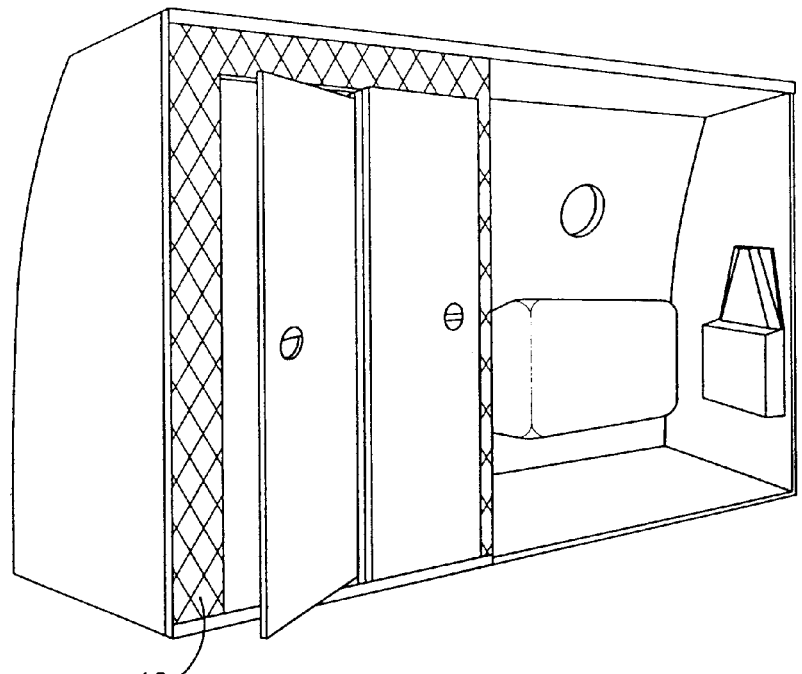
FIG. 9A is a perspective view of the present DOT lavatory and shower combination shown before takeoff with sliding wall door opened; and, FIG. 9B is a perspective view of the present DOT lavatory and shower combination after takeoff.
Figure 9B:
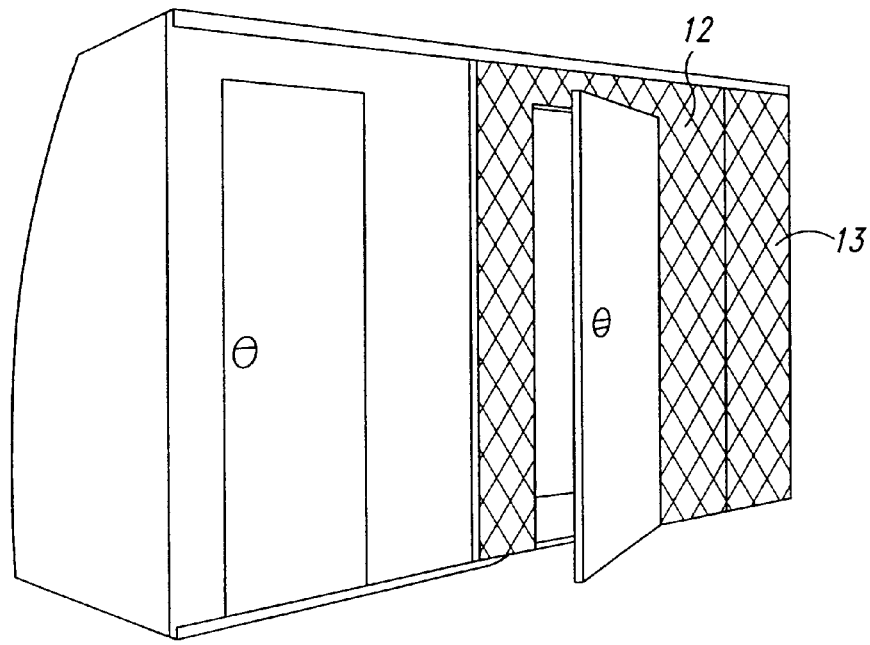

In this concept (see FIGS. 1 and 2), the normal 41" deep (d)×56" wide (w) DOT lavatory is located next to a door and doorway area where a fold-down or sliding wall and door 12 (see FIGS. 9A and 9B) for the function of the sliding wall and door closes the area off creating an area which can be used as a changing area. A door 1 facing the doorway area is added which can be used by passengers who have disrobed to gain access to the lavatory/shower module via the doorway area.

In this concept the shower area 2 is located right off the changing area 3 with a bi-fold door 4 which is locked separating the shower area 2 from the toilet area 5 (the floor is a couple of inches lower than the shower area). When this module is in shower mode, bi-fold door 4 is swung closed and the shower floor pan cover 6 is rotated up exposing the shower floor pan 7. When this module is in handicap lavatory mode, the bi-fold door 4 is swung open creating a large open area and shower floor pan cover 6 is rotated down covering the shower floor pan 7 making the shower floor area even with the floor in the toilet area so a wheelchair can roll across the floor.

Figure 3:
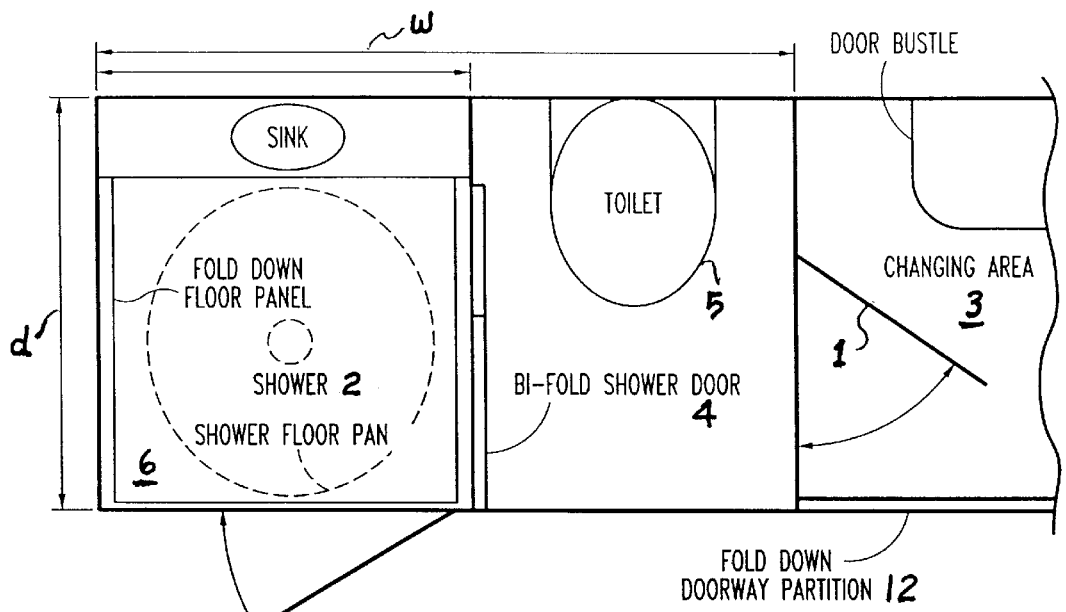
FIG. 3 is a top view of the floor plan of a further embodiment (concept 2) of the present DOT lavatory and shower combination with bi-fold shower door and fold-down floor panel to cover wet shower floor pan.
Figure 4:
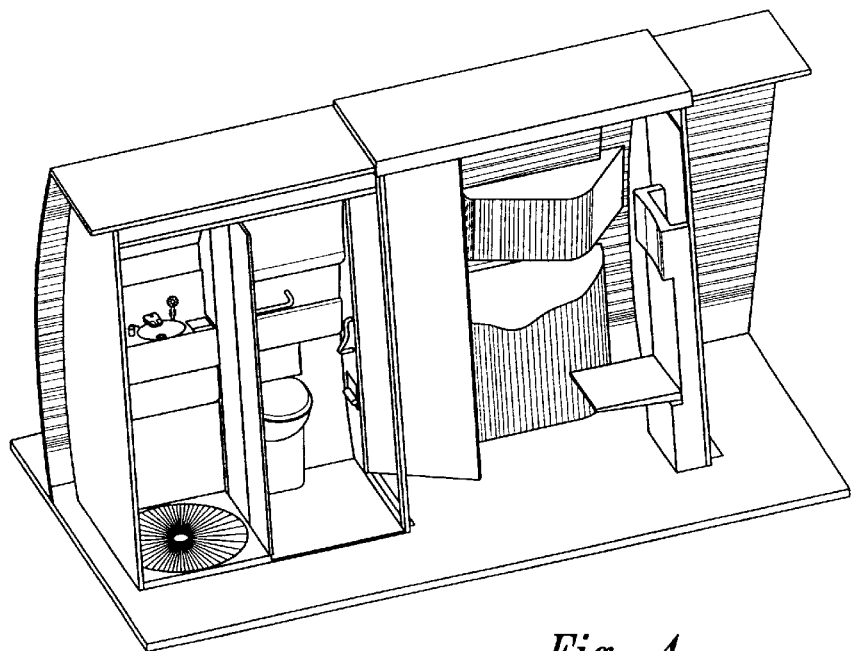
FIG. 4 is a cutaway view showing the interior of the embodiment of FIG. 3.

In another similar concept (see FIGS. 3 and 4) the toilet area 5 is located right off the changing area 3 with a bi-fold door 4 separating the toilet area 5 from the shower area 2. When this module is in the shower mode the bi-fold door 4 is swung closed and the shower floor pan cover 6 is rotated up exposing the shower floor pan 7. When this module is in handicap lavatory mode the bi-fold door 4 is swung open creating a large open area and shower floor pan cover 6 is rotated down covering the shower floor pan 7 making the shower floor area even with the floor in the toilet area so a wheelchair can roll across the floor.

Both of the above mentioned concepts use a shower floor pan cover 6 to cover the shower pan 7. This shower floor pan cover 6 serves two purposes: 1) to level the floor between the two compartments for a wheelchair to gain access and 2) to provide a dry surface in which a passenger can walk back across to access the sink and/or toilet after changing in order to shave, put makeup on, etc. The primary difference between the two concepts is sink location.

While these two concepts provide a large lavatory/shower area with the flexibility to accommodate a handicapped passenger, they cause the "passenger to lavatory ratios" to decrease because the lavatory cannot be used by one passenger when another passenger is using the shower portion of the module. This would cause another lavatory to be added to the configuration with the likelihood of losing possible four economy class seats.

Concept 2

Figure 5:
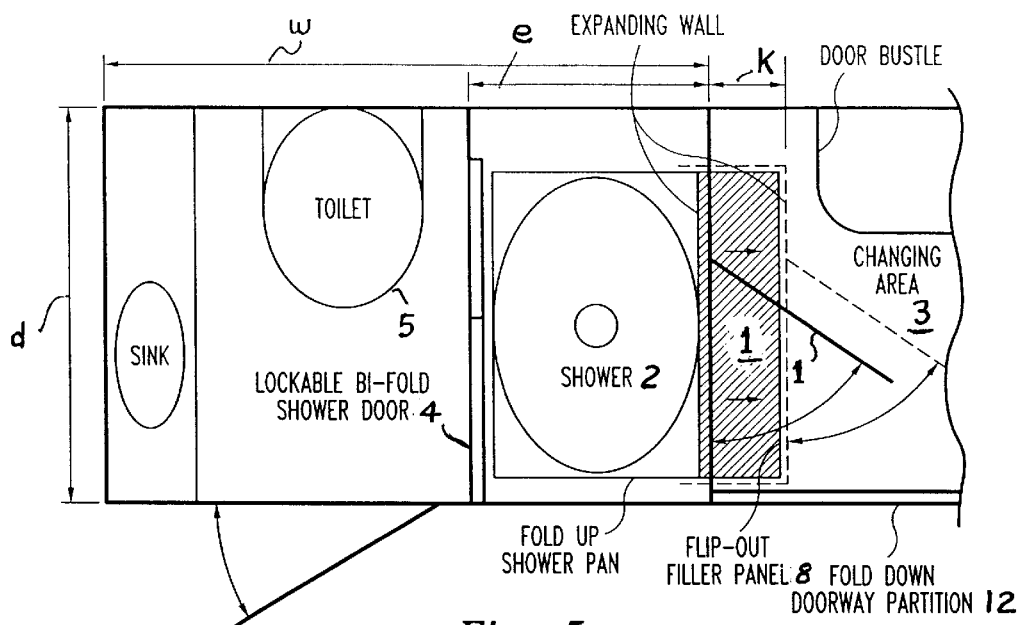
FIG. 5 is a top view of the floor plan in accordance with the embodiment of FIG. 3 (concept 2) however showing an expandable DOT lavatory and shower combination with lockable bi-fold shower door and fold-up shower floor pan to remove wet floor.
Figure 6:
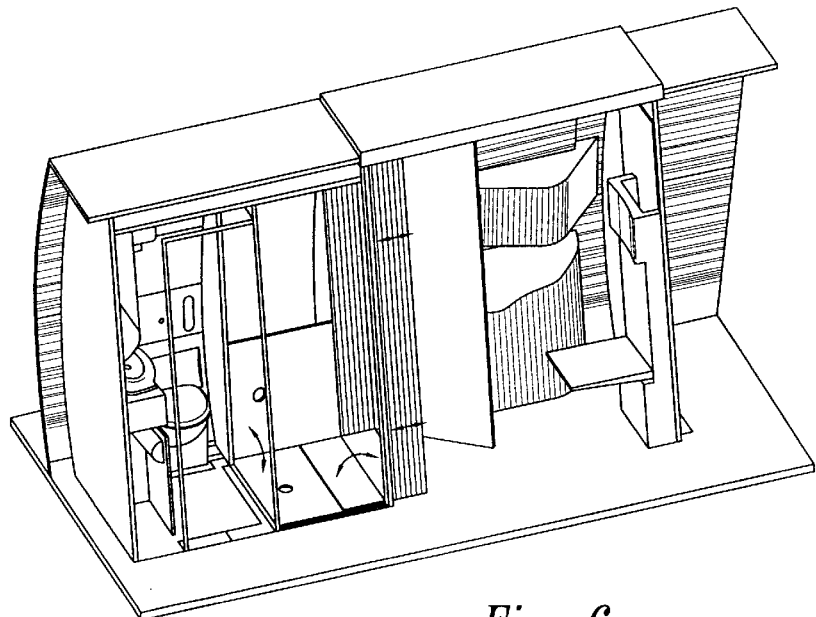
FIG. 6 is a cutaway view showing the interior of the embodiment of FIG. 5.

According to this concept (see FIGS. 5 and 6), again the normal 41" (w)×56" wide(w) DOT lavatory is located next to a door and doorway area where a fold-down or sliding wall/door 12 (see FIG. 9 for the function of the sliding wall/door) closes the area off creating an area which can be used as a changing area. A door 1 facing the doorway area is added which can be used by passengers who have disrobed to gain access to the lavatory/shower module via the doorway area.

In the second concept (as shown in FIGS. 3–6) the shower area 2 has the same floor level of both toilet 5 and changing area 3, and is located right off changing area 3 with a lockable bi-fold door 4 which can be locked separating the shower area 2 from the toilet area 5. When the module according to this embodiment is in shower mode, the bi-fold door 4 is swung closed and locked and the shower floor pan 6 is rotated down to the floor. When this module is in "handicap lavatory mode" the bi-fold door 4 is swung open and the shower floor pan 6 is rotated up creating a large open level area so a wheelchair can roll across the floor.

In order to provide enough room in both the shower area 2 and the toilet area 5 so that two different people are able to occupy the two spaces at the same time, bi-fold door 4 is arranged to separate the two spaces in such a way to allow adequate room for toilet area 5. This reduces the amount of room for shower area 2 at (e) to about 19" wide (compared to concept 1's 28" wide shower area (f)). The major area that needs to be added to compensate the shower area is approximate from above the knee and up since the feet area takes up the least amount of surface in the shower. Shower area 2 won't be used during takeoff and landing so wall 9 separating shower area 2 and changing area 3 could be made to be expandable into the adjacent doorway area. Also filler panel 8 could be rotated in place to fill the gap between the expanding wall 9 and the floor pan 6. The expanding wall 9 only needs to expand (k) or approximately 9" to provide sufficient room for shower area 2 but it can be further expanded to the door bustle.

The expanding wall 9, rotating filler panel 8 and the rotating shower floor pan 6 are key elements to making this concept work.

Concept 3

Figure 7:
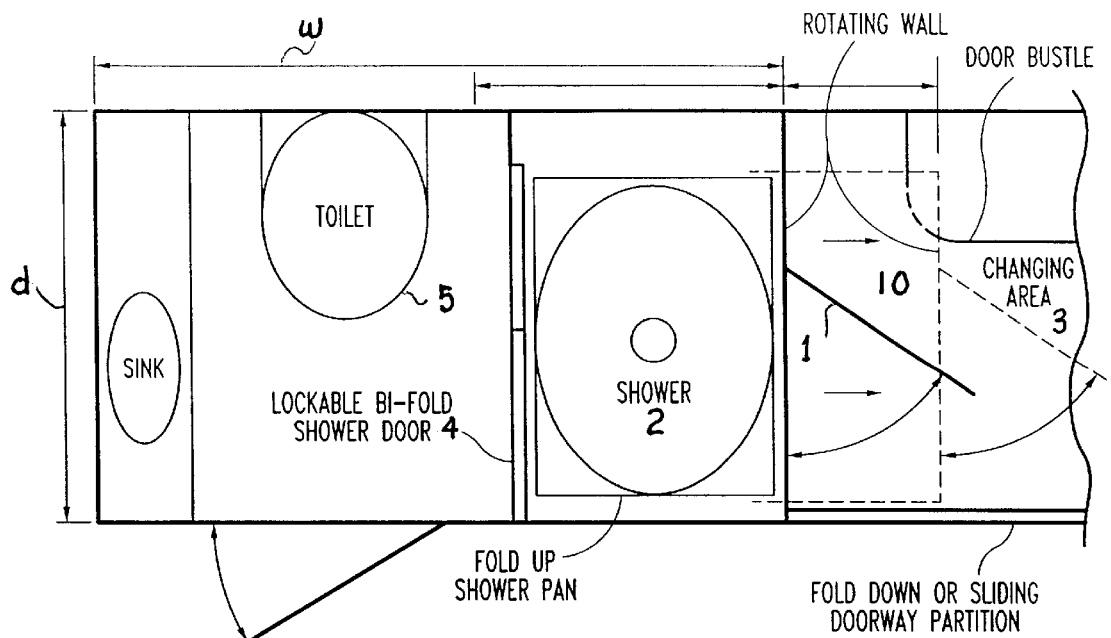
FIG. 7 is a top view of the floor plan of still a further embodiment (concept 3) of the present invention showing a rotating wall with door to expand DOT lavatory and shower combination with lockable bi-fold shower door and fold-up shower floor pan to remove wet floor.
Figure 8:
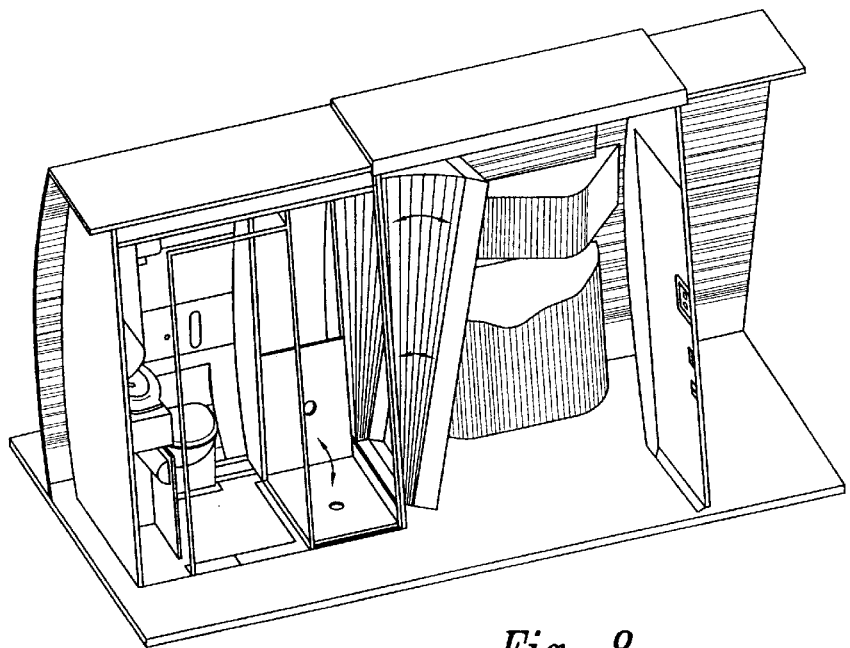
FIG. 8 is a cutaway view showing the interior of the embodiment of FIG. 7.

In this concept (see FIGS. 7 and 8) again the 41" deep× 56" wide DOT lavatory is located next to a door and doorway area where a fold-down or sliding wall/door 12 (see FIG. 9A, before takeoff and 9B after takeoff for the function of the sliding wall/door) closes the area off creating an area which can be used as a changing area. A door 1 facing the doorway area is added which can be used by passengers who have disrobed to gain access to the lavatory/ shower module via the doorway area.

In concept 3, the shower area 2 is located right off the changing area 3 with the locking bi-fold door 4 which can be locked separating the shower area 2 from the toilet area 5. When this module is "in shower mode" bi-fold door 4 is swung closed and locked and shower floor pan 6 is rotated down to the floor. When the module is "in handicap lavatory mode" bi-fold door 4 is swung open and shower floor pan 6 is rotated up creating a large open level area so a wheelchair can roll across the floor.

In order to provide enough room in both shower area 2 and the toilet area 5 so that two different people could occupy the two spaces at the same time, lockable bi-fold door 4 is arranged to separate the two spaces in a way to allow more room for the toilet. This reduces the amount of room for shower area 2 to about 19" wide. The major area that needs to be added to make up the lost space of the shower area is to expend space from above the knee up since the feet take up the least amount of surface area in the shower. The shower area 2 won't be used during takeoff and landing so the wall 10 separating the shore area 2 and the changing area 3 could be made to rotate from the top into the doorway area to provide more shoulder room. This concept would not cause any gaps at the floor and would allow water to drain right into the floor pan 6.

The concepts and illustrative embodiments hereinabove described create a useful space for both lavatory and shower applications, allowing usage of them either individually or both by opening or shutting of separating bi-fold door 4. The expandable, modular, multi-mode lavatory for aircraft described and illustrated has the flexibility for accommodating handicapped passengers, a full function lavatory (by folding up of the shower pan 11 and opening of the lockable bi-fold door 4, as well as offering two individuals use of the shower and lavatory simultaneously with full privacy. A new shower facility is provided while maintaining the DOT lavatory feature, no extra lavatories being needed and therefore no seats lost.

What is claimed is:

1. A multi-mode lavatory for aircraft comprising in combination:

a shower area;

said shower area having a floor, shower floor pan, and shower floor pan cover;

a toilet area including a floor;

a bi-fold door separating said shower area from said toilet area;

said bi-fold door disposed in a closed condition, and said shower floor pan cover disposed in an upward position exposing said shower floor pan when said multi-mode lavatory for said aircraft is in a shower mode; and, said bi-fold door disposed in an open position, and said shower floor pan cover disposed in a down position covering said shower floor pan when said multi-mode lavatory for said aircraft is in a handicap lavatory mode thereby positioning the floor of said shower area even with the floor of said toilet area.

2. A multi-mode lavatory for aircraft-comprising in combination:

a shower area;

a toilet area;

a-changing area;

a bi-fold door separating said shower area and said changing area for providing multiple use of said shower area and said toilet area at the same time;

a wall separating said shower area and said changing area;

a doorway area adjacent said wall; and, said wall separating said shower and said changing area expandable into said doorway area adjacent said wall during takeoff and landing of the aircraft.

3. The invention according to claim 2 further including a filler panel and a shower area floor pan, said filler panel disposed between said wall and said shower area floor pan.

4. In combination:

a DOT lavatory disposed adjacent a door and doorway area;

a moveable door for closing off said door and doorway area for providing a passenger clothes changing area; and, including a further door facing said doorway area for use by passengers who have disrobed to gain access to a lavatory shower module through said doorway area.

5. A shower and lavatory system for aircraft comprising in combination:

a DOT lavatory for accommodating handicapped passengers;

said DOT lavatory having a fold-up shower pan and a lockable bi-fold door; and, said shower and lavatory system providing simultaneous use by two aircraft passengers.

6. a DOT lavatory and shower module for aircraft comprising:

a doorway changing area;

a sink, toilet and shower disposed in a single modular housing disposed adjacent said doorway changing area; and, locking means for separating said sink and toilet from said shower and doorway changing area.

7. A method of operating an expandable, modular, multi-mode lavatory and shower combination in an aircraft comprising the steps of:

closing a bi-fold door and rotating a shower floor pan cover upward to expose a shower floor pan to operate the expandable, modular, multi-mode lavatory and shower combination in a shower mode; and, opening the bi-fold door and rotating the shower floor pan cover down to cover the shower floor pan to operate the expandable, modular, multi-mode lavatory and shower combination in a handicap lavatory mode.

8. An expandable, modular, multi-mode lavatory for aircraft comprising in combination:

a DOT lavatory including a toilet area provided adjacent to a door and doorway area; and, a sliding wall and door for closing off said door and doorway area thereby providing a clothes changing area for passengers; and, further including a shower area adjacent said changing area, and a bi-fold door separating said shower area from said toilet area.

9. In combination:

a DOT lavatory disposed adjacent a door and doorway area in an aircraft;

a shower area unused during takeoff of the aircraft;

a changing area;

a wall separating said shower area and said changing area;

said wall expandable into said doorway area; and, a rotatable filler panel for filling the gap between said expandable wall and a floor pan.

10. In combination:

a multimode lavatory shower module for aircraft;

a lavatory door disposed on the side of said multimode lavatory shower module; and, a sliding wall door structure over a lavatory door opening in the same direction as said lavatory door.

* * * * *